United States Patent
Chung (10) Patent No.: US 9,686,080 B2
(45) Date of Patent: *Jun. 20, 2017

(54) SYSTEM AND METHOD TO PROVIDE SECURE CREDENTIAL

(71) Applicant: EMC Corporation, Hopkinton, MA (US)

(72) Inventor: Leonard Chung, San Francisco, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/210,791

(22) Filed: Jul. 14, 2016

(65) Prior Publication Data

US 2016/0323112 A1 Nov. 3, 2016

Related U.S. Application Data

(63) Continuation of application No. 14/466,950, filed on Aug. 22, 2014, now Pat. No. 9,419,799.

(51) Int. Cl.
*H04L 29/06* (2006.01)
*H04L 9/32* (2006.01)

(52) U.S. Cl.
CPC ............ *H04L 9/3247* (2013.01); *H04L 9/321* (2013.01); *H04L 9/3297* (2013.01); *H04L 63/02* (2013.01);
(Continued)

(58) Field of Classification Search
CPC ..... H04L 9/3247; H04L 9/321; H04L 9/3297; H04L 63/02; H04L 63/0428;
(Continued)

(56) References Cited

U.S. PATENT DOCUMENTS 5,996,076 A * 11/1999 Rowney ................ G06F 21/445
 705/76
6,324,525 B1 * 11/2001 Kramer ................. G06Q 20/00
 705/40
(Continued)

OTHER PUBLICATIONS

Aiello, et al, 'Efficient, DoS-Resistant, Secure Key Exchange for Internet Protocols', CCS'02, Nov. 18-22, 2002, ACM 1-58113-612-9/02/0011, entire document, http://www.crypto.com/papers/jfk-ccs.pdf.*

(Continued)

*Primary Examiner* — Luu Pham
*Assistant Examiner* — Ronald Baum
(74) *Attorney, Agent, or Firm* — Van Pelt, Yi & James LLP (57) ABSTRACT

A system and method is illustrated for providing secure credential using a secure credential package stored on a client device and at least one key stored in a corporate network. In embodiments, an access connector receives credentials and a device unique identifier from the client device over a secure link, obtain the at least one key from the corporate network, apply the at least one key to the credentials and the device unique identifier to generate the secure credential package including the encrypted credential and the device unique identifier, send the secure credential package to the client device over the secure link, upon receiving the secure credential package from the client device, retrieve the at least one key via the key manager, decrypting the secure credential package using the at least one key to obtain the credentials, and validate the credentials against a user directory located in the corporate network.

21 Claims, 4 Drawing Sheets

(52) U.S. Cl.
CPC ........ *H04L 63/0428* (2013.01); *H04L 63/061* (2013.01); *H04L 63/08* (2013.01); *H04L 63/083* (2013.01); *H04L 63/0876* (2013.01); *H04L 2463/062* (2013.01)

(58) Field of Classification Search
CPC ..... H04L 63/061; H04L 63/08; H04L 63/083; H04L 63/0876
USPC ........................................................ 713/178
See application file for complete search history.

(56) References Cited

U.S. PATENT DOCUMENTS

| | | | | | |
|---|---|---|---|---|---|
| 7,272,639 | B1* | 9/2007 | Levergood | .............. | H04L 63/10 709/203 |
| 7,305,562 | B1* | 12/2007 | Bianco | .................... | H04L 63/08 709/229 |
| 7,448,080 | B2* | 11/2008 | Karjala | .............. | H04L 41/0806 379/901 |
| 2002/0095570 | A1* | 7/2002 | Eldridge | ........... | G06F 17/30011 713/155 |
| 2003/0196087 | A1* | 10/2003 | Stringer | .............. | G06F 21/6209 713/171 |
| 2004/0019808 | A1* | 1/2004 | Devine | ............... | G06F 11/0709 726/4 |
| 2009/0313682 | A1* | 12/2009 | Rajput | .................. | H04L 63/102 726/4 |
| 2010/0313022 | A1* | 12/2010 | May | .................... | H04L 63/0428 713/168 |
| 2014/0181518 | A1* | 6/2014 | Kim | .................... | G06F 21/6281 713/168 |

OTHER PUBLICATIONS

Sirbu, et al., 'Distributed Authentication in Kerberos using Public Key Cryptography', Proceedings of the Symposium on Network and Distributed System Security, 1997, entire document, http://people.ischool.berkeley.edu/~chuang/pubs/pkda.pdf.*

* cited by examiner

| FIELD | SECURITY | TYPE | DESCRIPTION |
|---|---|---|---|
| USERNAME | ENCRYPTED | UNICODE STRING | FULLY QUALIFIED USER NAME |
| PASSWORD | ENCRYPTED | UNICODE STRING | PASSWORD |
| VERSION | SIGNED | INTEGER | VERSION NUMBER FOR VERSIONING THE DATA STRUCTURE |
| TIMEGENERATED | SIGNED | DATETIME | TIMESTAMP FOR WHEN THE SECURE CREDENTIAL PACKAGE WAS GENERATED |
| DEVICE UNIQUE IDENTIFIER | ENCRYPTED | UNICODE STRING | DEVICE SPECIFIC IDENTIFIER |

SYSTEM AND METHOD TO PROVIDE SECURE CREDENTIAL

CROSS REFERENCE TO OTHER APPLICATIONS

This application is a continuation of co-pending U.S. patent application Ser. No. 14/466,950, entitled SYSTEM AND METHOD TO PROVIDE SECURE CREDENTIAL filed Aug. 22, 2014 which is incorporated herein by reference for all purposes.

FIELD OF THE INVENTION

The present system and method relates generally to computer security, and more specifically to providing and managing secure credentials.

BACKGROUND OF THE INVENTION

In today's computing environment, corporate services behind firewalls are often made available to computing devices outside the firewalls. To have access to the corporate services, credentials, i.e. user ID and password, are often used for authentication. However, computing devices, such as mobile devices, may be easily hacked. Thus, some conventional client-cached credential systems may expose the credentials if the computing devices are compromised. Further, the stolen credentials may be used to gain access to other corporate services that accept the comprised credentials.

Some existing centralized tokenization systems may avoid caching credentials on client devices. However, these systems often require either access to a full replica of credentials or are universally trusted for multiple services making them attractive hacking targets. Thus, conventional centralized tokenization systems have high exposure issues in addition to similar issues as faced by the conventional client-cached credential systems.

For example, in a conventional centralized tokenization system, when a user via a client device requests a corporate service for the first time, the user is prompted for credentials, such as user ID and password. After providing the credentials, the credentials may be exchanged for a service authorization token with a given authorization duration and passed back to the client device. In subsequent requests, the client device may pass the token to one or more intranet services behind the corporate firewall for authentication and/or authorization. Once granted, the token cannot be revoked until it times out. Thus, similar to the compromised computing device scenario above in the client-cached credential system, a compromised token may be used to access the corporate services before its timeout. Further, similar to the client-cached system, the compromised token may enable privilege escalation in that other corporate services that accept the token from the service are at risk.

BRIEF DESCRIPTION OF THE DRAWINGS

Some embodiments of the system and method are described, by way of example, with respect to the following figures.

DETAILED DESCRIPTION

A detailed description of one or more example embodiments of a system and method is provided below along with accompanying figures. While this system and method is described in conjunction with such embodiment(s), it should be understood that the system and method is not limited to any one embodiment. On the contrary, the scope of the system and method is limited only by the claims and the system and method encompasses numerous alternatives, modifications, and equivalents. For the purpose of example, numerous specific details are set forth in the following description in order to provide a thorough understanding of the present system and method. These details are provided for the purpose of example, and the system and method may be practiced according to the claims without some or all of these specific details. For the purpose of clarity, technical material that is known in the technical fields related to the system and method has not been described in detail so that the present system and method is not unnecessarily obscured.

It should be appreciated that the present system and method may be implemented in numerous ways, including as a process, an apparatus, a device, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the system and method. Applications may also be downloaded, in whole or in part, through the use of a software development kit or toolkit that enables the creation and implementation of the present system and method. In this specification, these implementations, or any other form that the system and method may take, may be referred to as techniques. In general, the order of the steps of disclosed processes may be altered within the scope of the system and method.

Figure 1:
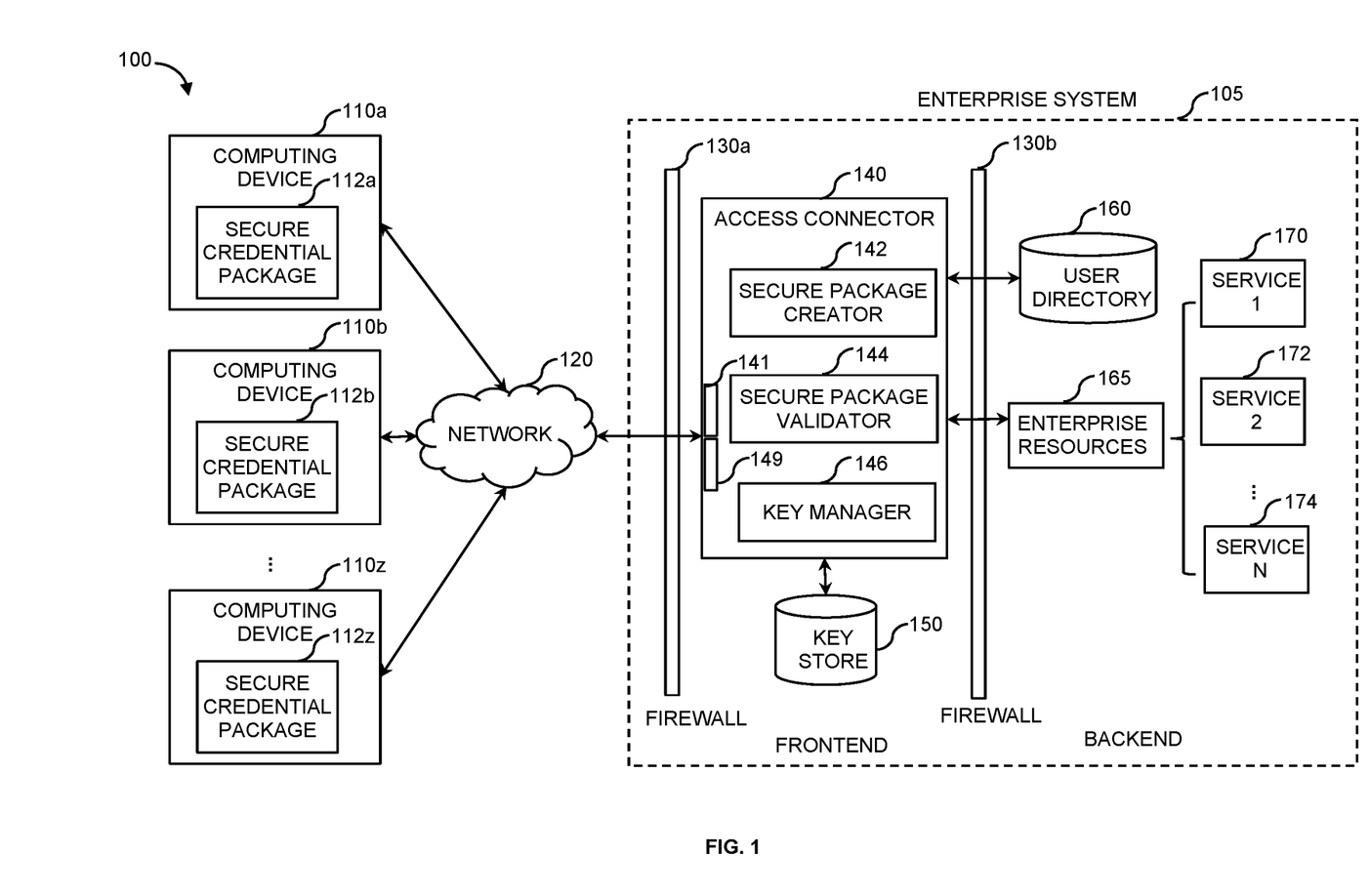
FIG. 1 is a diagram of an exemplary secure credential system in which securing credentials for authentication and authorization may be provided according to embodiments.

FIG. 1 is an exemplary system 100, in which securing credentials for authentication and authorization may be provided according to embodiments. The exemplary system 100 may include computing devices 110a-z communicatively coupled to an enterprise system 105 via a network 120. The computing devices 110a-z may include physical or virtual desktop computers, servers, networking devices, notebook computers, PDAs, mobile phones, digital image capture devices, and the like. Each of the computing devices 110a-z may be a personal computer (e.g., desktop or laptop), tablet computer, mobile device (e.g., personal digital assistant (PDA) or smart phone), set-top box, television, entertainment system, server (e.g., blade server or rack server), network storage device, router, switch, or any other suitable device and may vary in size, shape, performance, functionality, and price.

In embodiments, each of the computing devices 110a-z includes at least one processor unit, memory, storage, input device(s), and output device(s). The processor may be an instruction execution machine, apparatus, or device and may comprise a microprocessor, a digital signal processor, a graphics processing unit, an application specific integrated circuit (ASIC), a field programmable gate array (FPGA), etc. The processor unit may be configured to execute program instructions stored in the memory and/or the storage.

The memory may be volatile (such as RAM, for example), non-volatile (such as ROM, flash memory, etc., for example) or some combination of the two. The memory may be configured to store program instructions and data during operation of the computing devices 110a-z. In embodiments, the memory may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory may also include nonvolatile memory technologies such as nonvolatile flash RAM (NVRAM) or ROM. In embodiments, the memory may include a combination of technologies such as the foregoing, as well as other technologies not specifically mentioned.

In embodiments, each of the computing devices 110a-z includes at least one storage (e.g., removeale and/or non-removeable). The storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the computing devices 110a-z. In embodiments, computer readable instructions to implement embodiments provided herein may be stored in the storage. The storage may also store other computer readable instructions to implement an operating system, an application program, program data, and the like. Computer readable instructions may be loaded in the memory for execution by the processor, for example.

The computing devices 110a-z may include input device(s), such as at least one of a keyboard, mouse, pen, voice input device, touch input device, scanner, satellite dish, still camera, video input device, and/or any other input device. Output device(s), such as one or more displays, speakers, printers, and/or any other output device may also be included in the computing devices 110a-z. Input device(s) and output device(s) may be operatively coupled to the computing devices 110a-z via a wired connection, wireless connection, or any combination thereof. In embodiments, an input device or an output device from another computing device may be operatively coupled to a computing device and used as input device(s) or output device(s) for the computing device.

Various components of computing devices 110a-z may be operatively coupled and connected by various interconnects. Such interconnects may include a Peripheral Component Interconnect (PCI), such as PCI Express, a USB, firewire, an optical bus structure, a local bus structure, and the like. In embodiments, components of the computing devices 110a-z are interconnected by the network 120. For example, the memory is comprised of multiple physical memory units located in different physical locations interconnected by the network 120.

In embodiments, the computing devices 110a-z may be mobile devices. The mobile devices may run an operating system and applications on top of the operating system. Applications running on the computing devices 110a-z may store some data in a secure and/or encrypted location in the mobile devices, where access may be restricted to authorized applications. The data stored in the secure location may include files, databases, and the like. Secure data may use encryption such as Advanced Encryption Standard (AES) encryption, and the like. In embodiments, secure credential packages 112a-z are stored in secure and/or encrypted location on the computing devices 110a-z.

Still referring to FIG. 1, the computing devices 110a-z may also include at least one communication interface to communicate with at least one of the remote computing devices 110a-z via the network 120. The communication interface may include, but not limited to, a modem, a Network Interface Card (NIC), an integrated network interface, a radio frequency transmitter/receiver, an infrared port, a Universal Serial Bus (USB) connection, a network processing unit, or other interfaces for connecting the computing devices 110a-z to other computing devices 110a-z. The connections to the network 120 may include a wired connection or a wireless connection to transmit and/or receive data over communication media.

The communication interface may interface with a wireless and/or a wired network 120. Examples of wireless networks include, for example, a BLUETOOTH network, infrared, near field communication a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In embodiments, communication interface may include logic configured to support direct memory access (DMA) transfers between the memory and other devices in the system 100.

The network 120 may provide connectivity among various components of the system 100 and may be implemented using the protocols such as TCP/IP, or some other logical or physical connection. In embodiments, the network 120 is implemented to provide support for various storage architectures such as Storage Area Network (SAN), Network-Attached Storage (NAS), Direct-Attached Storage (DAS), etc. Networks used to transfer data between the computing devices 110 and 190 and the data store 105 may include Fibre Channel, SCSI, Ethernet, Gigabit Ethernet, and other types of communication networks.

As illustrated, the computing devices 110*a-z* may communicate over the network 120 with the enterprise system 105 in order to obtain services 170-174 provided by enterprise resources 165. In embodiments, the enterprise system 105 may be a corporate network, which may further comprise one or more corporate sub-networks. One or more firewalls 130*a-b* or other network boarder protection device and/or filter may separate the network 120 (e.g., the Internet) and the corporate network and divide corporate sub-networks. The enterprise resources 165 may include email servers, file sharing servers, SaaS applications, Web application servers, other application servers, and the like. The enterprise resources 165 may be premise-based resources, cloud based resources, and the like. The services 170-174 provided by the enterprise resources 165 may include email service, file sharing service, web application services, among others.

In order to protect the enterprise resources 165, the exemplary secure credential system 100 may place the enterprise resources 165 in a secure intranet backend and use an access connector 140 located in the frontend of the enterprise system 105 for authentication and authorization of extranet clients, such as the computing devices 110*a-z* connected to the network 120 (e.g., the Internet). In embodiments, the frontend of the enterprise system 105, in which the access connector 140 is located, may be a perimeter network system, also referred to as a demilitarized zone (DMZ). One or more firewalls 130*a-b* or other network boarder protection device and/or filter may separate the DMZ from the intranet backend and/or the extranet, e.g., the Internet. The access connector 140 may authenticate and/or authorize the computing devices 110*a-z* connected to the network 120 (e.g., the Internet). Once authenticated and/or authorized, a client devices connected to and/or as part of the extranet may be granted access to one or more intranet services 170-174 located in the backend of the enterprise system 105.

The backend of the enterprise system 105 may be a secure intranet system, which may include a user directory 160 for basic authentication and the enterprise resources 165. The services 170-174 provided by the enterprise resources 165 may be business enterprise server system, application server system, database management server system, a messaging, and/or enterprise collaboration server system. Though different server types or server utilizations may be included. The user directory 160 may store user authentication and authorization data in order to authenticate and authorize users of the intranet enterprise resources 165.

Though the exemplary enterprise system 105 is shown to include one frontend system and one backend system separated by one firewall 130*b*, it should be understood that multiple systems may be provided, including multiple perimeter network systems and multiple secure intranet backend systems separated by multiple firewalls. Further, though the backend of the enterprise system 105 is shown to include one user directory 160 and one set of enterprise resources 165, it should be understood that various numbers of user directories and enterprise resources may be utilized.

The access connector 140 may include a receiving 141, a secure package creator 142, a secure package validator 144, a key manager 146, and a sender 149. When users using the computing devices 110*a-z* to authenticate for the first time, credentials, such as usernames and passwords, along with other information from the computing devices 112*a-z* may be received by the receiver 141 over a secure link of the network 120. After receiving credentials, the secure package creator 142 may create secure credential packages 112*a-z* using the credentials and other information from the computing devices 112*a-z* as well as a key obtained by the key manager 146. In embodiments, the key may be stored in the key store 150 operatively coupled to the access connector 140. Though FIG. 1 shown the key store 150 as a separate repository from the access connector 140 and operatively coupled to the access connector 140, the key store 150 may be located inside or outside the access connector 140 according to embodiments. Further, the key store 150 may be located in the frontend or the backend of the enterprise system 105 according to embodiments.

Once the secure credential packages 112*a-z* are created by the secure package creator 142, the sender 149 may send the secure credential packages 112*a-z* to the computing devices 112*a-z*. Upon receiving, the computing devices 110*a-z* may store the secure credential packages 112*a-z* in encrypted locations of the computing devices 112*a-z*, according to embodiments. During subsequent authentication and authorization, the secure credential packages 112*a-z* may be used in place of clear text username and password.

For example, the computing devices 110*a-z* may send the secure credential packages 112*a-z* to the secure package validator 114 for authentication and authorization against the user directory 160 in the backend of the enterprise system 105. In embodiments, the enterprise system 105 may support and enable single-sign-on authentication processes. The single-sign-on processes may allow a user to provide the secure credential packages 112*a-z*, which are then verified by the secure package validator 144 according to embodiments. After a successful validation, access to one or more services 170-174 of the enterprise resources 165 may be granted, without requiring the user to provide authentication credentials to each individual service.

It should be understood that the arrangement of system 100 illustrated in FIG. 1 is one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components in the arrangement of the computing devices 110*a-z*. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed and/or computer-implemented include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that variation of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
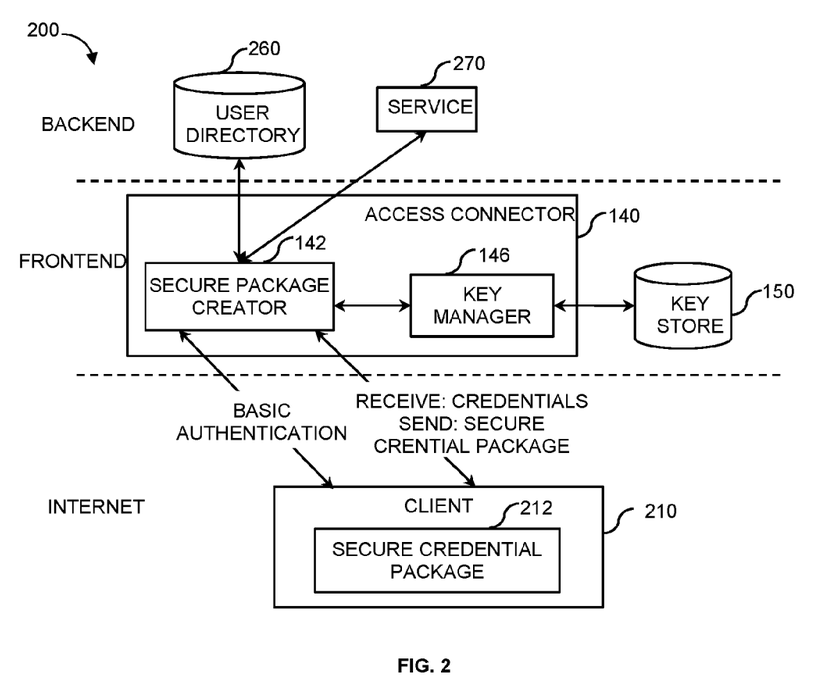
FIG. 2 is a block diagram illustrates a secure credential package creation in an exemplary secure credential system according to embodiments.

Referring now to FIG. 2, FIG. 2 illustrates a block diagram 200 of the exemplary secure credential system 100 during a secure credential package 212 creation, according to embodiments. In embodiments, the access connector 140 may be located behind a firewall in the frontend of a corporation network. An exemplary corporate network is shown as the enterprise system 105 in FIG. 1. A service 270 may be located behind another firewall in the backend of the corporation network. The first time a client device 210 connects to the access connector 140 in order to be authenticated and authorized to access the backend service 270, the access connector 140 may determine whether or not the service 270 supports secure credential authentication. In case the backend service 270 indicates that secure credential authentication is not supported, the client device 210 may proceed with basic authentication, such as using credentials received from the client device 210 to authenticate against a user directory 260 located in the backend. In case the backend service 270 indicates that it is capable of secure credential authentication, the secure package creator 142 may use the credentials received from the client device 210 along with other data to create the secure credential package 212.

During secure credential package 212 creation, credentials such as username and password may be received by the access connector 140 via the receiver 141 residing on the access connector 140. The credentials may be sent by the client 210 over a secure link of the network 120 using communication protocols for secure communication, such as Hypertext Transfer Protocol Secure (HTTPS), Transport Layer Security (TLS), Secure Sockets Layer (SSL), and the like. Along with the credentials, the receiver 141 may also receive client device specific information, such as a device unique identifier, from the client device 210.

In addition to the receiver 141 for receiving the credentials and the client device 210 information, the access connector 140 may include the key manager 146 to obtain at least one key. In embodiments, the at least one key is obtained from the key store 150 located in the corporate network. In embodiments, the at least one key stored in the key store 150 operatively coupled to the access connector 140 is generated by the key manager 146 and may be retrieved then changed by the key manager 146 before stored again in the key store 150.

Having received the credentials and the client device 210 information and obtained the key, the secure package creator 242 may apply the key to the credentials and the device unique identifier to generate the secure credential package 212. The secure credential package 212 may include the encrypted credentials and the encrypted device unique identifier. Additional data may be included in the secure credential package 212 as further illustrated in FIG. 3. After creation, the secure credential package 212 may be sent to the client device 210 by the sender 149 and stored on the client device 210. In embodiments, the secure credential package 212 is stored in a secure and/or encrypted location on the client device 210.

Though one secure credential package 212 is shown in FIG. 2 as being stored on the client device 210, more than one secure credential packages 212 may be stored on the client device 210 in embodiments. For example, when more than one user and/or one user with multiple credentials use a client device 210 to connect to the access connector 140, more than one secure credential packages 212 may be created and stored on the client device 210. During authentication, a user may choose a secure credential package 212 for authentication and authorization based on, for example, a nickname associated with each secure credential package 212.

Figure 3:
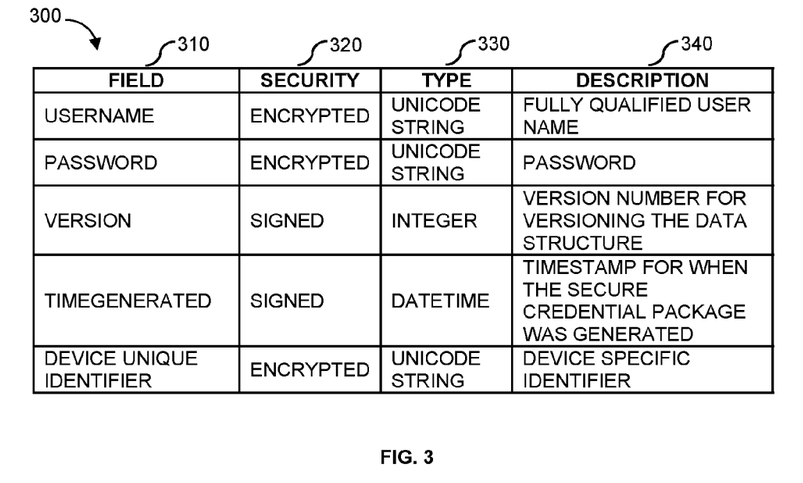
FIG. 3 is a table illustrating an exemplary format of a secure credential package according to embodiments.

FIG. 3 is a table 300 illustrating an exemplary format of a secure credential package used for secure credential authentication and authorization, according to embodiments. As shown in the table 300, exemplary fields 310 of the secure credential package may include username, password, version, timegenerated, and device unique identifier, among others. In embodiments, the username may be a fully qualified user name, such as an email address including a user's full name and a domain name. The password may be a password the user provides during the secure credential package creation as illustrated in FIG. 2. The version may be a version number used to version a data structure, such as a version number used to version the secure credential package. The timegenerated field may be a timestamp indicating when the secure credential package was generated. And the device unique identifier field may be a client device specific identifier received from the client device 210 during the secure credential package creation as shown in FIG. 2. In embodiments, the device unique identifier may be provided by an internal subsystem within the client device 210, such as a storage device, a memory subsystem, or a processor.

The fields 310 may be specified as different types 330. For example, the username, password, and device unique identifier fields may be received as unicode string over a secure link; the version may be obtained by the secure package creator 142 as an integer; and the timegenerated may be obtained by the secure package creator as a datetime type. It should be understood that the exemplary field 310, type 330, and description 340 are for illustration. Other fields may be used in place of and/or in conjunction with and/or in addition to the exemplary field 310. For example, instead of receiving username and password as credentials, biometrics information received from input devices of the client 210, such as fingerprint scanner, voice input, and retinal scanner may be received by the receiver 141 and used in place of and/or in conjunction with and/or in addition to the username and password as credentials in the exemplary table 300.

Among the fields 310, the username, password, and device unique identifier fields may use encryption as the security method 320 to preserve confidentiality. For example, the encryption of the username may be performed by the secure package creator 142 to apply the key retrieved by the key manager 146 to the unicode string username received from the client device 210 over a secure link. Similarly, the encryption of the password and the device unique identifier may be performed by the secure package creator 142 to apply the key retrieved by the key manager 146 to the unicode string password and the device unique identifier received from the client device 210 over a secure link. In addition to using encryption as the security method 320, the version and timegenerated fields may use signing as the security method 320 to provide integrity. The signing may also be performed by the secure package creator 142 using the key stored in the key store 150 and a version and a timestamp assigned by the secure package creator 142.

The encryption and signing method may use any encryption and signing method known in the art. Encryption renders data unreadable by unauthorized parties. The original data message is referred to as a plaintext message or plaintext. The encrypted message may be referred to as a ciphertext, wherein encryption may include any means to convert plaintext into ciphertext. Decryption may include any means to convert ciphertext into plaintext, i.e., to recover the original message. Examples of different types of cryptography in use today include symmetric cryptography and asymmetric cryptography.

In symmetric cryptography, encryption and decryption are performed with the same key. Asymmetric cryptography may use two keys: a public key and a private key. The public key is published, so that any party can use the public key to encrypt any message. However, only the privately held, unpublished key may be used to decrypt the message encrypted with the public key. The two keys are related by a one-way function, so as to make it infeasible to determine the private key from the public key.

In some symmetric authentication systems, a Message Authentication Code (MAC), and the like, may be used as a signature to ensure data integrity. The MAC is computed as a function of both the message content and a key, wherein both the sender and the designated target share the secrete key. The sender transmits the message and appends the MAC. The message can be either plaintext or ciphertext. The receiver re-computes the MAC from the message and accepts the integrity of the message only if the re-computed MAC agrees with the transmitted MAC. Only the sender of the message could generate a valid signature for that message, thereby authenticating the message for the receiver.

In an asymmetric authentication system, the authenticating data is known as a digital signature. A digital signature is a cryptographic primitive that provides a means for a user or an entity to bind its identity to a piece of information. The digital signature is computed as a function of the message content and the private key of the sender. A digital signature may be used to prove the identity of the sender and the integrity of data. The sender transmits the digital signature to a receiving party, who then performs a verification upon the digital signature using a public key of the sender.

A digital signature is a cryptographic primitive that provides a means for a user or an entity to bind its identity to a piece of information. A digital signature of a message is a sequence of bytes dependent on some secret known only to the signer, and, additionally, on the content of the message being signed. Such signatures must be verifiable, if a dispute arises as to whether a party signed a document. The process of signing entails transforming the message and a key unique to a particular user into a tag called a digital signature. A digital signature may be used to prove the identity of the sender and the integrity of data. To verify the digital signature, a recipient of a digitally signed message can use a verification rule associated with the digital signature scheme. Any attempt to modify the contents of the message or forge a signature may be detected when the signature is verified.

System and method of secure credential according to embodiments may encrypt fields such as username, password, and device unique identifier using either symmetric or asymmetric encryption methods known in the art to preserve confidentiality. For example, when a symmetric encryption method is used, the key stored in the key stored 150 and retrieved by the key manager 146 may be applied to the plaintext fields of username, password, and device unique identifier in unicode strings and the encrypted ciphertext may be included in the secure credential package 212 and stored on the client device 210. In another example, when an asymmetric encryption method is used, a key obtained by the key manager 146, such as a public key, may be applied to the plaintext fields of username, password, and device unique identifier in unicode strings and the encrypted ciphertext may be included in the secure credential package 212 and stored on the client device 210. Without storing the key on the client device 210, the encrypted credentials and the encrypted device unique identifiers included in the secure credential package 212 cannot be decrypted and comprised even if the client device 210 is stolen. Thus, by including the encrypted information but not the key on the same client device, the secure credential package 212 preserves confidentiality.

Information such as version and timegenerated may need to be verified by the client device 210 and/or the access connector 140 to ensure the proper functioning of secure credential system. By signing, but not necessarily encrypting, the integrity of secure credential package may be verified. Similar to encryption, system and method of secure credential according to embodiments may sign fields such as version and timegenerated using either symmetric or asymmetric cryptography known in the art to provide integrity. Consider, by way of illustration and not limitation the following examples compute MAC as a method of signing for integrity check.

For example, when a symmetric encryption method is used, a MAC may be computed by the secure package creator 142 as a function of the version and a key. In embodiments, the key may be obtained from the key manager 146. Once the MAC is computed, the access connector 140 may send the signed version field as part of the secure credential package and append the MAC to the client. In embodiments, the version field may be sent as plaintext or ciphertext message. During subsequent authentication and/ or authorization, the access connector 140 may re-compute the MAC from the received message and accepts the integrity of the message if the re-computed MAC as a signature agrees with the transmitted MAC. Similarly to the MAC computation and verification for the version field, a MAC may be computed as a function of the timegenerated and a key by the secure package creator 142, and during subsequent authentication and/or authorization, the access connector 140 may re-compute the MAC from the received message and accepts the integrity of the message if the re-computed MAC as a signature agrees with the transmitted MAC. The above examples use MAC as a method of signing for integrity check. Other methods well known in the art may be used in place of MAC as a method of signing for integrity check.

In another example, when an asymmetric encryption method is used, a key obtained by the key manager 146, such as a private key stored in the key store 150, may be applied to the fields of version and timegenerated fields to generate the signed version and the signed timegenerated field. Upon receiving the secure credential package 212 including the signed version and the signed timegenerated field, the client device 210 may apply a public key associated with the private key and verify the version and the timegenerated. Further upon receiving the secure credential package 212 during authentication and authorization, the access connector 140 may apply a public key associated with the private key and verify the version and the timegenerated to ensure integrity.

In addition to integrity check, the signature verification on the client device 210 may also be used to provide better user experience according to embodiments. For example, after applying a public key to obtain the timegenerated field, applications on the client device 210 may determine an expiration date of the secure credential package 212 according to policies. Based on a determination that the secure credential package 212 is about to expire, a reminder may be provided to the user. Similarly, after applying a public key to obtain the version field, applications on the client device 210 may determine whether the version of the secure credential package 212 is up-to-date. A reminder may be provided to the user responsive to a determination that the secure credential package 212 is out-of-date.

Figure 4:
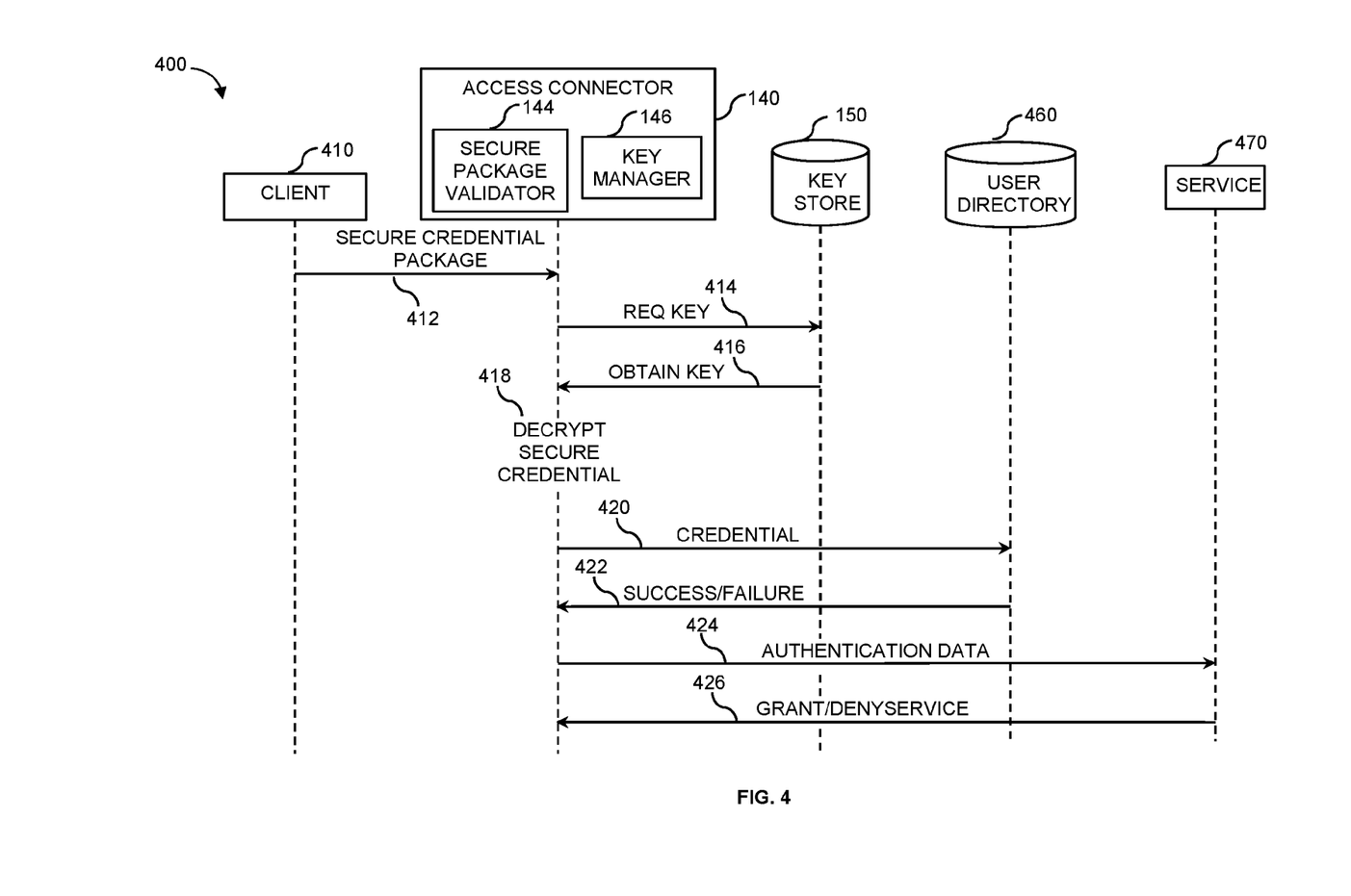
FIG. 4 is a message flow diagram illustrating using a secure credential package for authentication and authorization according to embodiments.

FIG. 4 is a message flow diagram illustrating a method 400 for providing secure credential using the secure credential package created by the access connector 140, according to embodiments. The method 400 may be performed in, for example, the secure credential system illustrated in FIG. 1. After a secure credential package is created as shown in FIG. 2 with an exemplary format as shown in FIG. 3, a client 410 may use the secure credential package stored on the client device 410 for authentication and authorization. The client 410 may send the secure credential package in step 412 to the access connector 140. The access connector 140 may receive the secure credential package via the receiver 141. Upon receiving the secure credential package, the key manager 146 may retrieve at least one key. In embodiments, the at least one key may be retrieved from the key store 150 by first requesting the key in step 414. In response to the request, the key store 150 may send the at least one key and the key manager 146 may obtained the at least one key in step 416.

After obtaining the at least one key and the secure credential package, the secure package validator 144 may decrypt the secure credential package in step 418 by applying the at least one key to the fields in the secure credential package. For example, the username, password, and device unique identifier may be decrypted by applying the at least one key to the encrypted username, encrypted password, and encrypted device unique identifier. In addition, the version and timegenerated field may be verified in step 418 by applying the at least one key to the signed version and the signed timestamp, according to embodiments. The decrypted credentials such as the username and password may then be authenticated using the basic credentials stored in the user directory 460 in step 420. A success or failure as the authentication result may then be received by the secure package validator 144 in step 422. Upon a successful authentication, in step 424, authentication data, such as the credentials, may be sent by the secure package validator 144 to a service 470 located in the backend of the corporate network. Based on the authentication data, the service 470 may grant or deny the service request in step 426.

The secure credential system and method according to embodiments have several security features that are advantageous over conventional systems and methods. First, the secure credential package comprising encrypted and signed credentials stored in the client device is more secure. For example, in order for basic authentication to not require users to enter their credentials every time they try to access a resource, the client devices must cache the credentials according to conventional client-cached credential systems. Though some client devices, such as mobile devices may provide security measures, such as storing data encrypted in an encrypted location and/or mobile operating system keychain, the cached credentials may still be compromised if the mobile device is stolen and/or while unlocked. The reason is that the key for decryption is present on the client device and the key may be discovered or the security measure may be circumvented when the client device is unlocked without the protection of the key.

In contrast, the secure credential system and method encrypt the credentials using a key not stored on the client device. Though the secure credential package persists on client devices, the credentials may only be decrypted by the access connector and are unreadable to the client devices. Even if the client devices are stolen and unlocked, the credentials themselves are irretrievable. Thus, by storing the secure credential package on the client device, but not the key, the secure credential system and method according to embodiments may provide more confidentiality than conventional client-cached credential systems and methods.

Second, relative to the conventional centralized tokenization system, the secure credential system and method according to embodiments may not present a centralized high value target for potential hackers. Since the key, not a full replica of credentials, is stored behind the firewall in the enterprise system, there is no single database of credentials or single authentication service that may be compromised en-masse.

Third, relative to the tokens in conventional centralized tokenization systems, the secure credential packages are more manageable in that the secure credential package may be centrally revoked ad-hoc, by time, per-user, or en masse. For example, by changing a key, secure credential packages generated using the key may be revoked and may not be used for successful authentication even before the secure credential package expires. In addition to revoke en masse, the version and the timegenerated field may be used to enforce time based auto logout. When a new version of a secure credential package is available, older versions may be revoked and may not be used for successful authentication. Similarly, by comparing the timegenerated field and policies specifying expiration time of secure credential packages, older secure credential packages may be revoked.

The timegenerated field may be especially useful as a security measure. For example, when a suspicious secure credential package is identified, the timegenerated field may be analyzed. The signature of the timegenerated field may be verified, and the creation time of the secure credential package may be derived from the timegenerated field by un-signing. Even if the signature appears to be valid, as a safety measure, a time-based policy may be specified to revoke secure credential packages created around the creation time of the suspicious secure credential package.

Figure 5:
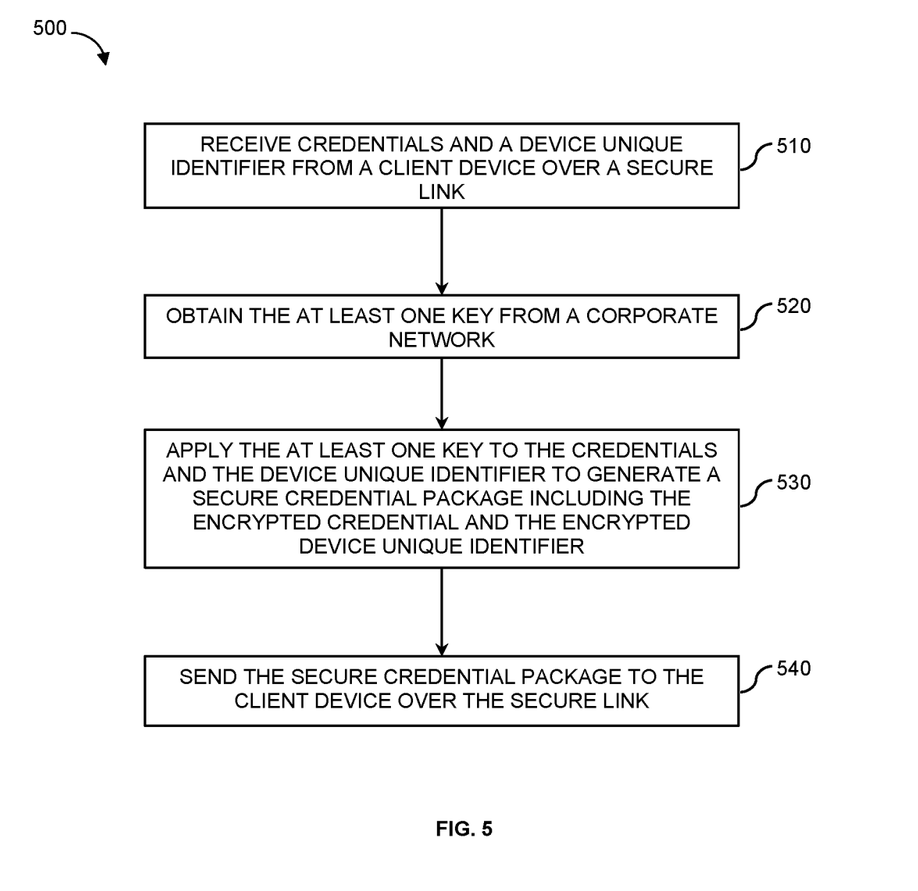
FIG. 5 is a diagram of an exemplary computer implemented method executed to provide a secure credential package for authentication and authorization according to embodiments.

FIG. 5 is a diagram of a computer implemented method 500, according to embodiments, for providing secure credential using a secure credential package stored on a client device and at least one key stored in a corporate network. The computer implemented method 500 may be carried out by, for example, the access connector 140 in the exemplary system illustrated in FIG. 1. In order to create the secure credential package for authentication and/or authorization, an operation 510 is first executed by the receiver 141 to receive credentials and a device unique identifier from the client device over a secure link. An operation 520 is then executed by the key manager 146 to obtain the at least one key from the corporate network. Having obtained the credentials, the device unique identifier, and the at least one key, an operation 530 is executed by the secure package creator 142 to apply the at least one key to the credentials and the device unique identifier to generate the secure credential package including the encrypted credential and the encrypted device unique identifier. The created secure credential package is sent to the client device over the secure link during the execution of an operation 540.

For the sake of clarity, the processes and methods herein have been illustrated with a specific flow, but it should be understood that other sequences may be possible and that some may be performed in parallel, without departing from the spirit of the system and method. Additionally, steps may be subdivided or combined.

All references cited herein are intended to be incorporated by reference. Although the present system and method has been described above in terms of specific embodiments, it is anticipated that alterations and modifications to this system and method will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the system and method is not to be limited to the details given herein. It is therefore intended that the disclosure and following claims be interpreted as covering all such alterations and modifications as fall within the true spirit and scope of the system and method.

What is claimed is:

1. A computer implemented method for authenticating a client device using a secure credential package stored on the client device and at least one key stored in a corporate network, the computer implemented method comprising:
   receiving, by the computer, the secure credential package from the client device in connection with an authenticating of the client device, wherein the secure credential package includes encrypted credentials and an encrypted unique device identifier;
   obtaining at least one key from the corporate network, wherein the at least one key is stored in a key store that is located in a first zone of the corporate network;
   decrypting the secure credential package using the at least one key to obtain credentials;
   validating the credentials against a user directory located in the corporate network;
   in the event of a successful validation in response to the validating the credentials, sending the credentials to a backend service located in the corporate network for a service authentication; and
   authenticating the client device using the secure credential package based at least in part on the at least one key obtained from the key store and information stored on a resource of the corporate network, wherein the resource of the corporate network is located in a second zone of the corporate network, wherein the second zone is located behind a firewall for the second zone of the corporate network relative to the client device, the firewall for the second zone being located behind the first zone of the corporate network.

2. The method of claim 1, wherein the first zone is a secure zone.

3. The method of claim 2, wherein the first zone is behind a firewall for the first zone of the corporate network, wherein the firewall for the second zone is behind the firewall for the first zone.

4. The method of claim 1, wherein the secure credential package is received over a secure link.

5. The method of claim 1, further comprising:
   receiving credentials and a device unique identifier from the client device;
   obtaining the at least one key from the corporate network, wherein the at least one key is stored in a key store that is located in a first zone of the corporate network; and
   generating the secure credential package including encrypted credentials and an encrypted device unique identifier based at least in part on the credentials and the device unique identifier.

6. The method of claim 5, further comprising:
   sending the secure credential package to the client device.

7. The method of claim 6, wherein the client device upon receiving the secure credential package, stores the secure credential package on the client device.

8. The method of claim 1, wherein the credentials include a user name and a password.

9. The method of claim 1, wherein the secure credential packages includes:
   the encrypted credentials;
   the encrypted device unique identifier;
   a version of the secure credential package signed using the at least one key; and
   a timestamp signed using the at least one key, the timestamp indicates a creation time of the secure credential package.

10. The method of claim 9, further comprising:
    enforcing a logout by invalidating at least one of the signed version or the signed timestamp.

11. The method of claim 1, wherein the at least one key is changeable and stored in the key store.

12. The method of claim 1, further comprising:
responsive to a backend service located in the corporate network not capable of handling the secure credential package, instructing the client device over the secure link to store the credentials in a secure storage on the client device.

13. An access connector located in a corporate network used for providing secure credential, the access connector comprising:
a receiver configured to use at least one hardware processor to receive credentials and a device unique identifier from a client device over a secure link, the at least one hardware processor to receive the secure credential package from the client device in connection with the authentication of a client device;
a key manager configured to use at least one hardware processor to obtain at least one key from the corporate network, wherein the at least one key is stored in a key store that is located in a first zone of the corporate network; and
a secure package validator configured to decrypt the secure credential package using the at least one key to obtain the credentials, validate the credentials against a user directory located in the corporate network, and upon a successful validation, send the credentials to a backend service located in the corporate network for a service authentication, and authenticate the client device using at least one hardware processor to receive the secure credential package from the client device in connection with an authenticating of the client, wherein the resource of the corporate network is located in a second zone of the corporate network, wherein the second zone is located behind a firewall for the second zone of the corporate network relative to the client device, the second firewall for the second zone being located behind the first zone of the corporate network.

14. The system of claim 13, wherein the first zone is a secure zone.

15. The system of claim 14, wherein the first zone is behind a firewall for the first zone of the corporate network, wherein the firewall for the second zone is behind the firewall for the first zone.

16. The system of claim 13, wherein the receiver is further configured to use at least one hardware processor to receive credentials and a device unique identifier from a client device over a secure link.

17. The system of claim 13, further comprising:
a secure package creator configured to use at least one hardware processor to apply the at least one key to the credentials and the device unique identifier to generate a secure credential package including encrypted credentials corresponding to the credentials and an encrypted device unique identifier corresponding to the device unique identifier.

18. The system of claim 17, further comprising:
a sender configured to use at least one hardware processor to send the secure credential package to the client device.

19. A system for authenticating a client device using a secure credential package stored on a client device and at least one key stored in a corporate network, comprising:
at least one hardware processor configured to:
receive the secure credential package from the client device in connection with an authenticating of the client device, wherein the secure credential package includes encrypted credentials and an encrypted unique device identifier;
obtain at least one key from the corporate network, wherein the at least one key is stored in a key store that is located in a first zone of the corporate network;
decrypt the secure credential package using the at least one key to obtain credentials;
validate the credentials against a user directory located in the corporate network;
in the event of a successful validation in response to the validating the credentials, send the credentials to a backend service located in the corporate network for a service authentication; and
authenticate the client device using the secure credential package based at least in part on the at least one key obtained from the key store and information stored on a resource of the corporate network, wherein the resource of the corporate network is located in a second zone of the corporate network, wherein the second zone is located behind a firewall for the second zone of the corporate network relative to the client device, the firewall for the second zone being located behind the first zone of the corporate network; and
at least one memory coupled to the at least one hardware processor and configured to provide the at least one hardware processor with instructions.

20. The system of claim 19, wherein the first zone is a secure zone.

21. The system of claim 20, wherein the first zone is behind a firewall for the first zone of the corporate network, wherein the firewall for the second zone is behind the firewall for the first zone.

* * * * *